(12) United States Patent
Cyganski et al.

(10) Patent No.: US 9,274,208 B2
(45) Date of Patent: Mar. 1, 2016

(54) ENHANCED RF LOCATION METHODS AND SYSTEMS

(75) Inventors: David Cyganski, Holden, MA (US); R. James Duckworth, Shrewsbury, MA (US)

(73) Assignee: Worcester Polytechnic Institute, Worcester, MA (US)

(*) Notice: Subject to any disclaimer, the term of this patent is extended or adjusted under 35 U.S.C. 154(b) by 721 days.

(21) Appl. No.: 13/536,361

(22) Filed: Jun. 28, 2012

(65) Prior Publication Data

US 2013/0038488 A1 Feb. 14, 2013

Related U.S. Application Data

(60) Provisional application No. 61/502,672, filed on Jun. 29, 2011.

(51) Int. Cl.
*G01S 3/02* (2006.01)
*G01S 5/02* (2010.01)

(52) U.S. Cl.
CPC ............. *G01S 5/0257* (2013.01); *G01S 5/021* (2013.01); *G01S 5/0294* (2013.01); *G01S 5/0252* (2013.01)

(58) Field of Classification Search
CPC ..... G01S 5/0252; G01S 5/0257; G01S 5/021; G01S 5/0294

USPC ......................................................... 342/450
See application file for complete search history.

(56) References Cited

U.S. PATENT DOCUMENTS

| 7,292,189 | B2 | 11/2007 | Orr et al. |
| 2006/0127096 | A1* | 6/2006 | Nichols ...................... 398/115 |
| 2010/0277339 | A1 | 11/2010 | Cyganski et al. |
| 2010/0295733 | A1 | 11/2010 | Luo et al. |
| 2011/0244881 | A1 | 10/2011 | Bando et al. |

OTHER PUBLICATIONS

Coyne, J. et al. FPGA-Based Co-processor for Singular Value Array Reconciliation Tomography. 16th Annual IEEE Symposium on Field-Programmable Custom Computing Machines, Palo Alto, CA, Apr. 2008.
Woodacre, B. et al. WPI Precision Personnel Locator System: Antenna Geometry Estimation Using a Robust Multilateralization Technique. Institute of Navigation, International Technical Meeting, Anaheim, California, Jan. 2009.
Amendolare, V. et al. WPI Precision Personnel Locator System: New RF Location Algorithms for Improved Precision Location in High Multipath Indoor Environments. Worcester Polytechnic Institute ION JNC 2010.

* cited by examiner

*Primary Examiner* — Frank J McGue
(74) *Attorney, Agent, or Firm* — Burns & Levinson, LLP; Orlando Lopez

(57) ABSTRACT

Methods and systems that use the time-wise stability of RF location systems and the short time accuracy and spatial stability of inertial tracking system to increase the accuracy of tracking method.

14 Claims, 7 Drawing Sheets

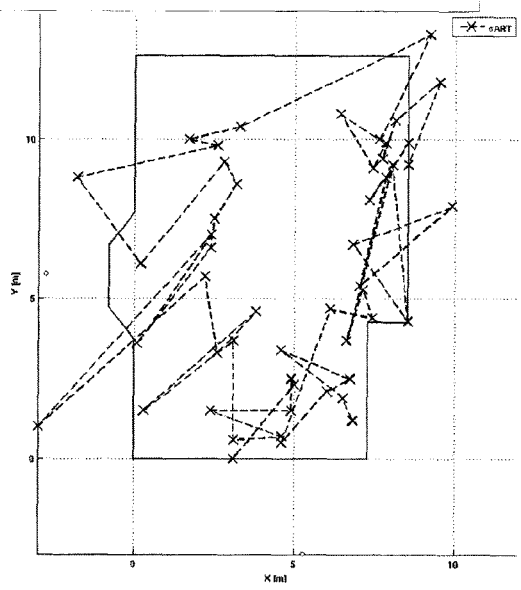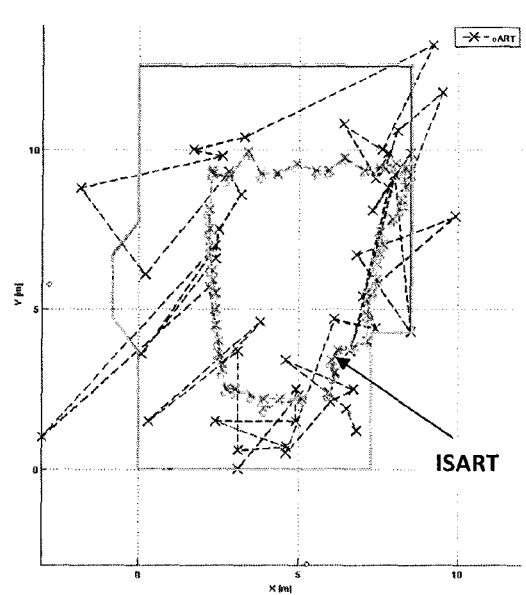
Fig. 4a
Fig. 4b

ENHANCED RF LOCATION METHODS AND SYSTEMS

CROSS REFERENCE TO RELATED APPLICATIONS

This application claims priority to U.S. Provisional Application Ser. No. 61/502,672, filed Jun. 29, 2011, entitled ISART EXTENSION OF THE SART, which is incorporated by reference herein in its entirety and for all purposes.

STATEMENT REGARDING FEDERALLY SPONSORED RESEARCH OR DEVELOPMENT

This invention was made partially with U.S. Government support from the Department of Homeland Security under grant No. NNG09CP11C. The U.S. Government has certain rights in the invention.

BACKGROUND

These teachings relate to locating objects by use of combined methods.

The precise tracking of persons and/or objects is desirable in many applications. One way to achieve precision indoor location with electronic tracking systems is by ranging (estimating the distance) between one or more base stations and a mobile locator device. Known examples of electronic locating systems that perform ranging are GPS technology, in which satellite transmissions are used by mobile receivers to determine the position of the mobile receivers, and cell phone location systems, where tower-located base station receivers estimate the location of mobile hand-held cell phone transmitters.

However, in the past, several factors have hindered the use of known electronic locating systems in indoor environments. One major impediment to the use of known locator systems is multi-path signal contamination, referring to the signal scattering effect caused by the local environment between the transmitter and the receiver, such as walls, support beams and furnishings. Other impediments include insufficient signal strength, lack of precision, the FCC spectrum non-compliance of ultra wide band systems, the need for pre-existing infrastructure, and failure of simple pulse distortion models in actual through-building and multi-path propagation conditions.

RF (radio frequency) systems for electronic locating have been developed. In general, radio based tracking systems attempt to extract time of-flight information from radio signals that have propagated through a building, from the object being tracked to externally located reference units, or vice versa. However, radiofrequency electromagnetic waves are refracted, reflected and diffracted by structural members and objects within the building. These phenomena result in a received signal that can be defined as the sum of the direct-path component and the "multi-path" components. Methods for mitigating the impact of "multi-path" components have been disclosed but may be insufficient in the face of severe multi-path conditions. Additionally, the reference node antenna constellation is often limited by practical considerations, which can often result in a severe geometric dilution of precision.

Inertial tracking is possible in some situations, in which linear accelerations and rotational velocities of an inertial measurement unit are computationally integrated to obtain a relative position track. However, inertial position estimates are the outcome of a double time integral, which causes their error (due to measurement unit errors such as bias and scale error and timewise drift of these errors) to grow with time as $t^2$, while rotational error, similarly due to a single integration, grows as t. These problems can be mitigated to some extent by use of very low bias error devices but at typically hugely increased monetary cost, increased size and increased power consumption. Furthermore, as inertial tracking solutions are relative in nature (both in position and rotation), accurate initialization of orientation and position are necessary to track absolute position. This kind of initialization can be difficult to impossible to conduct in some situations or in a sufficiently timely fashion to be practicable, such as in applications involving first responders at an emergency.

There is a need for a system and method that overcomes or ameliorates the effects of both the problem of limited direct path availability as well as geometric dilution of precision for RF systems and the short time accuracy and relative outcome nature and initialization dependence of inertial tracking systems.

BRIEF SUMMARY

Methods and systems that use the time-wise stability of RF location systems and the short time relative position displacement accuracy and spatial stability of inertial tracking system to increase the accuracy of a combined tracking method and system are presented hereinbelow.

In one or more embodiments, the method of these teachings includes determining relative displacements between a location of a mobile node at each of two or more data captures, the mobile node exchanging RF signals with a number of reference nodes, re-phasing the RF signals to a virtual node location; constituting re-phased RF data and providing the RF data and the re-phased RF data to an RF location component, wherein effective signal-to-noise ratio and hence position estimation accuracy from the RF information are increased beyond what would be achievable with only the RF information. The advantage of combining the short-term relative motion information with RF information can also be interpreted as providing solutions consistent with high performance inertial devices with smaller, lower cost devices.

Other embodiments of the method of these teachings are also disclosed.

In one or more embodiments, the system of these teachings includes a number of reference nodes, a mobile node, the mobile node exchanging RF signals with a number of reference nodes, an inertial measurement unit providing relative position data for a location of the mobile transmitter, an estimator component receiving the position data and providing a first position estimate, a re-phasing component receiving a relative displacement between a location of the mobile node at each of two or more signal exchanges, the re-phasing component producing re-phased RF signals, the relative displacement obtained from the first position estimate for the location of the mobile node at each of the two or more signal exchanges and an RF location component receiving the re-phased RF data and providing a second position estimate for the location of the mobile node.

In other embodiments, the system of these teachings includes a number of RF receivers, a mobile RF transceiver, the mobile RF transceiver providing RF data to the number of RF receivers, an inertial measurement unit providing position data for a location of the mobile transmitter, an estimator component receiving the position data and providing a first position estimate, a re-phasing component receiving a relative displacement between a location of the mobile RF transceiver at each of two or more data captures; the mobile RF transceiver providing RF data to the number of RF receivers at said each of the two data captures, the re-phasing component producing re-phased RF data, the relative displacement obtained from the first position estimate for the location of the mobile RF transceiver at each of the two or more data captures and an RF location component receiving the re-phased RF data and providing a second position estimate for the location of the mobile RF transceiver.

Other embodiments of the system of these teachings are also disclosed.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 4a and 4b are graphical representations of results of an exemplary embodiment of the system of these teachings.

DETAILED DESCRIPTION

Figure 1A:
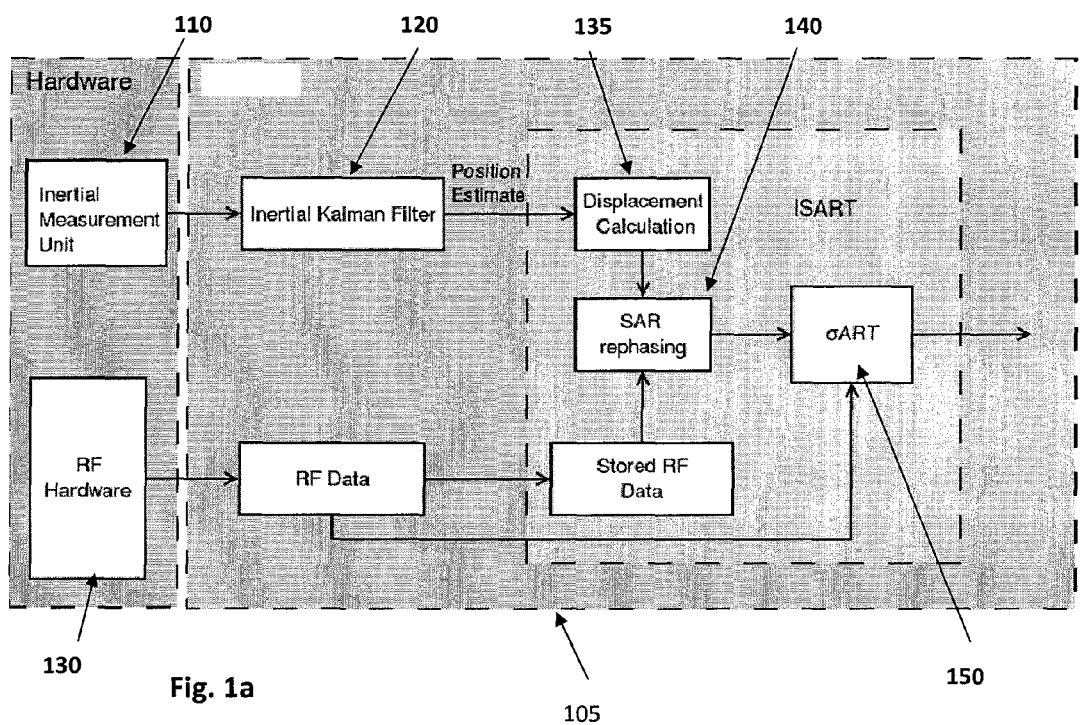
FIG. 1a is a schematic block diagram representation of one embodiment of the system of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The present teachings will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

Before describing the present teachings in detail, certain terms are defined herein for the sake of clarity.

An "estimator component," as used herein, is a component that obtains an "optimal" estimate of desired quantities from data provided by a noisy environment where "optimal" means that errors are minimized in some predetermined fashion.

A "Kalman filter," as used herein, is an estimator component that operates recursively on streams of noisy input data to produce a statistically optimal estimate of the underlying system state.

Methods and systems that use the time-wise stability of RF location systems and the short time accuracy and spatial stability of inertial tracking system to increase the accuracy of a combined tracking method and system are presented hereinbelow.

In one or more embodiments, the system of these teachings includes a number of reference nodes, a mobile node, the mobile node exchanging RF signals with a number of reference nodes, an inertial measurement unit providing relative position data for a location of the mobile node, an estimator component receiving the position data and providing a first position estimate, a re-phasing component receiving a relative displacement between a location of the mobile node at each of two or more signal exchanges, the re-phasing component producing re-phased RF signals, the relative displacement obtained from the first position estimate for the location of the mobile node at each of the two or more signal exchanges and an RF location component receiving the re-phased RF data and providing a second position estimate for the location of the mobile node.

Specific embodiments may take the following forms: The mobile node may include a transmitter sending an RF ranging signal to receivers in the reference nodes. The mobile node may include a receiver which receives RF ranging signals from transmitters in each of the reference nodes. The mobile node may include a transceiver which engages in two-way exchanges of RF ranging signals with transceivers in each of the reference nodes. In all of these cases the mobile and reference nodes may comprise additional data communication systems (transmitters, receivers or transceivers) to exchange data such as the short term relative motion track information as would be captured by an inertial sensor and data related to the RF signals captured from received RF ranging signals so that this information may be processed by one or more of the nodes.

In one instance, the mobile node includes a transmitter sending an RF ranging signal to receivers in the reference nodes.

In one or more specific embodiments, the system of these teachings includes a number of RF transmitters, a mobile RF transceiver, the mobile RF transceiver receiving RF data from the number of RF transmitters, an inertial measurement unit providing position data for a location of the mobile transmitter, an estimator component receiving the position data and providing a first position estimate, a re-phasing component receiving a relative displacement between a location of the mobile RF transceiver at each of two data captures; the mobile RF transceiver receiving RF data from the number of RF transmitters at said each of the two data captures, the re-phasing component producing re-phased RF data, the relative displacement obtained from the first position estimate for the location of the mobile RF transceiver at each of the two data captures and an RF location component receiving the re-phased RF data and providing a second position estimate for the location of the mobile RF transceiver.

Figure 1B:
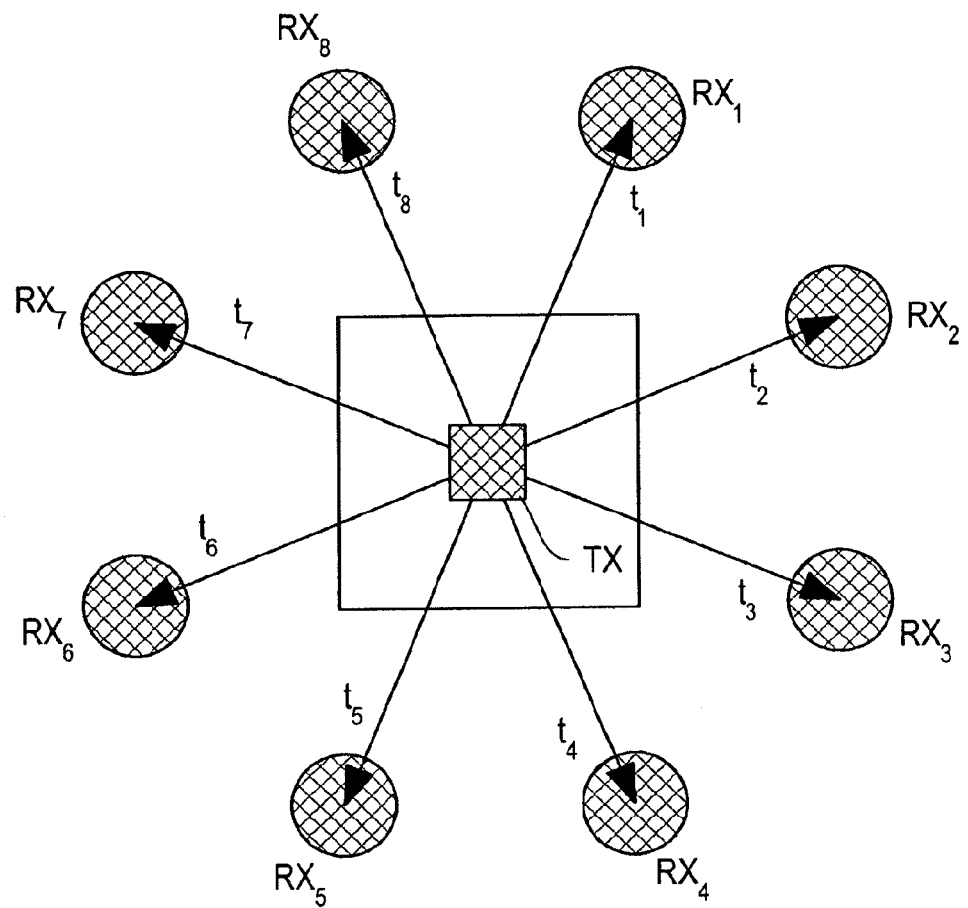
FIG. 1b is a schematic graphical representation of components of one embodiment of the system of these teachings.

One embodiment of the system of these teachings is shown in FIGS. 1a and 1b. Referring to FIGS. 1a and 1b, subsystem 130 represents a mobile unit which is to be tracked or attached to the object to be tracked. Subsystem 105 represents one of several fixed position reference units which may also act as analysis units in which solutions are computed from data collected from the totality of reference units. In the embodiment shown there is an inertial measurement unit 110 which provides linear acceleration and rotational velocity data to the estimating component 120, a Kalman filter in the embodiment shown. The estimating component, using the inertial data and initial conditionals provided during a manual initialization procedure, estimates the position of the mobile unit subsequent to initialization. The mobile component of the RF subsystem 130, in this embodiment a transmitter, transmits an RF ranging signal. The operation of the RF subsystem 130 is shown in more detail in FIG. 1b. Referring to FIG. 1b, the signal emitted by mobile transmitter portion of the RF subsystem 130, labeled TX, is received by receiver components in one or more RF receivers located in several fixed location reference unit nodes, labeled $RX_1$-$RX_8$. Data that represents the received signals is transmitted through a data communications subsystem (not shown in the diagram) from the receivers $RX_1$-$RX_8$ to one or more reference nodes for processing. The position estimates obtained from the Kalman filter 120, for a set of mobile positions (two or more positions of the mobile unit obtained consecutively in time) in the form of data is transmitted from the mobile unit to the reference node or nodes where track estimation is to be performed, these nodes being also called analysis nodes, and subsequently provided to a displacement calculator 135. The displacement calculator differences the position information to obtain a representation of the relative motion of the mobile unit from the inertial data over the time interval captured in the position set which was received. The RF data, from each of the two or more positions of the mobile RF transceiver, obtained from each of the RF receivers and the inertial displacement data is then processed to obtain a combined solution in the analysis component 105. A re-phasing component 140 receives the relative displacement of the mobile RF transceiver at each of two or more data captures and the RF data from the totality of RF receivers at each of the two or data captures and provides re-phased RF data to an RF location component 150. One embodiment of the RF location component uses the σART (singular value array reconciliation tomography) algorithm for location estimation (also sometimes denoted by SART).

It should be noted that, although FIGS. 1a and 1b have been described in terms of the specific embodiment in which the mobile node is a transmitter and the reference nodes are receivers, FIG. 1b shows the configuration for the general embodiment in which $RX_1$-$RX_8$ are the reference nodes and TX is the mobile node and the RF data in FIG. 1a can be generated in any of the specific embodiments.

Figure 1C:
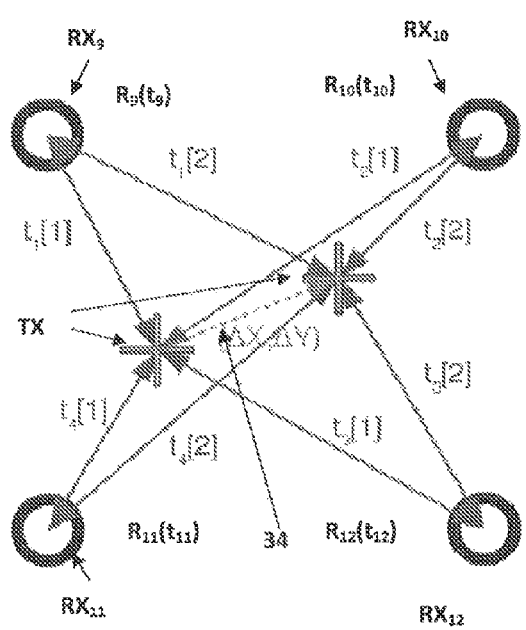
FIGS. 1c and 1d show schematic of graphical representation of the re-phasing operation as applied in one embodiment of the system of these teachings during operation of the system.
Figure 1D:
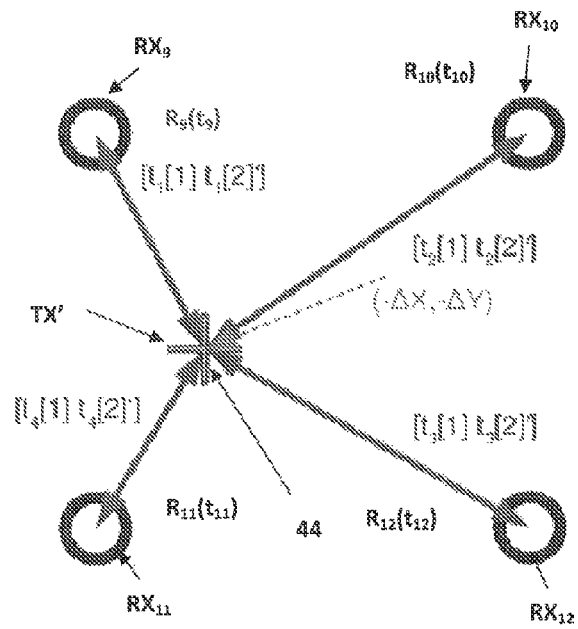

In one instance, from the relative displacement ($\Delta X$, $\Delta Y$) between two data captures from the mobile node TX, the re-phasing component 140 re-phases the RF data signals so that they appear to originate from the same location, One instance of re-phasing is shown in FIGS. 1c and 1d. Referring to FIGS. 1c and 1d, in FIG. 1c, a transmitter moves from a first position to a second position undergoing a translation indicated by the arrow 34, In FIG. 1c, the signals received from the second position can be re-phased to account for the translation information. provided by the inertial subsystem 110 and 120 (other independent means) to obtain signals for inclusion of the RF location processing of the first point's position. These new re-phased signals appear to be from new virtual node locations 44 related to the true reference node antenna positions by translation of those antenna positions by the same translation ($-\Delta X$, $-\Delta Y$) as indicated by the arrow in FIG. 1c. When no absolute orientation information regarding the displacements is available, this operation or re-phasing may be applied for several potential orientations with the selection of the best orientation made later in the process when the data and the short term track information are analyzed.

The re-phasing operation depends upon a presumed location of the mobile unit where estimation of this location is the ultimate goal to the complete operation of the system. Thus, this estimation process involves trial solutions based upon presumed locations and subsequent evaluations of the likelihood of the presumed location based upon some form of internal metric which measures consistency of the data with that expected from the geometry of the propagation paths. Thus it is advantageous if the solution process comprises an exhaustive or iterative search of the solution space over presumed locations and if it yields a measure of data consistency. One such embodiment, but not limited to it, is the SART process used in descriptions of embodiments below.

The re-phasing process bears similarities to the process known as synthetic aperture radar (SAR) wherein the phase history of the known motion of an emitter is used to synthesize a high resolution image of a reflecting target region. In this teaching a similar phase history for signals propagated between a mobile unit and multiple stationary reference units are advantageously combined to obtain an improved absolute location and track estimate for the mobile unit's position using only a short term accurate and relative (unknown absolute coordinates and unknown absolute orientation) motion track of the mobile unit. In one or more embodiments this method for obtaining the short-term relative motion track of the mobile unit involves the use of an inertial sensor. In one or more embodiments the advantageous method of combining the phase history information is the singular value array reconciliation tomography (SART) method. From these embodiments the nomenclature iSART (inertial SART) arises which shall be used below to denote the overall process without limitation to embodiments that specifically use inertial short term information or the SART position solution process.

Re-phasing can be further described in relation to FIGS. 1c and 1d as follows. In FIGS. 1c and 1d, the fixed position of four receivers, $RX_9$-$RX_{12}$, are depicted as circles. In addition, the figures display the inverse of signal delays $\{t_n[m]\}$ (i.e., the signal delay expected if the transmitter TX were in fact located at that preseumed position) associated with the position at each of the two data captures. In the operation of the re-phasing component 140, a processor generally applies the inverse of signal delay $\{t_n[m]\}$ to each received signal $R_n(t)$ so that a set of aligned received signals, $R'_n(t)=R_n(t+t_n)=x(t) a_n e^{i\Phi}$ is formed, where signals in this expression should be interpreted as the analytic, complex, representations of the real valued signals in the system. In the equation, $R_n(t)$ denotes a signal received at the nth receiver, and $R'_n(t)$ is an aligned or range re-phased received signal. That is, $R'_n(t)$ corresponds to the signal R(t) had it not traveled a distance that would result in a propagation delay of $\{t_n[m]\}$. In the equation, x(t) is the transmitted signal, $a_n e^{i\Phi}$ is the constant and propagation path independent amplitude and phase by which the aligned received signal $R'_n(t)$ differs from the transmitted signal x(t).

It should be noted that re-phasing can also be performed for a number of potential positions of the mobile transceiver TX and for a number of potential orientations of the short-term displacement track being used to generate the applied displacements. The position estimate outcome and a metric that denotes the likelihood of that outcome that results from applying that re-phasing is provided to the RF location component 150. A best displacement track orientation and mobile transmitter position are selected on the basis of the metric resulting from these trials as evaluated by RF location component 150.

Figure 2:
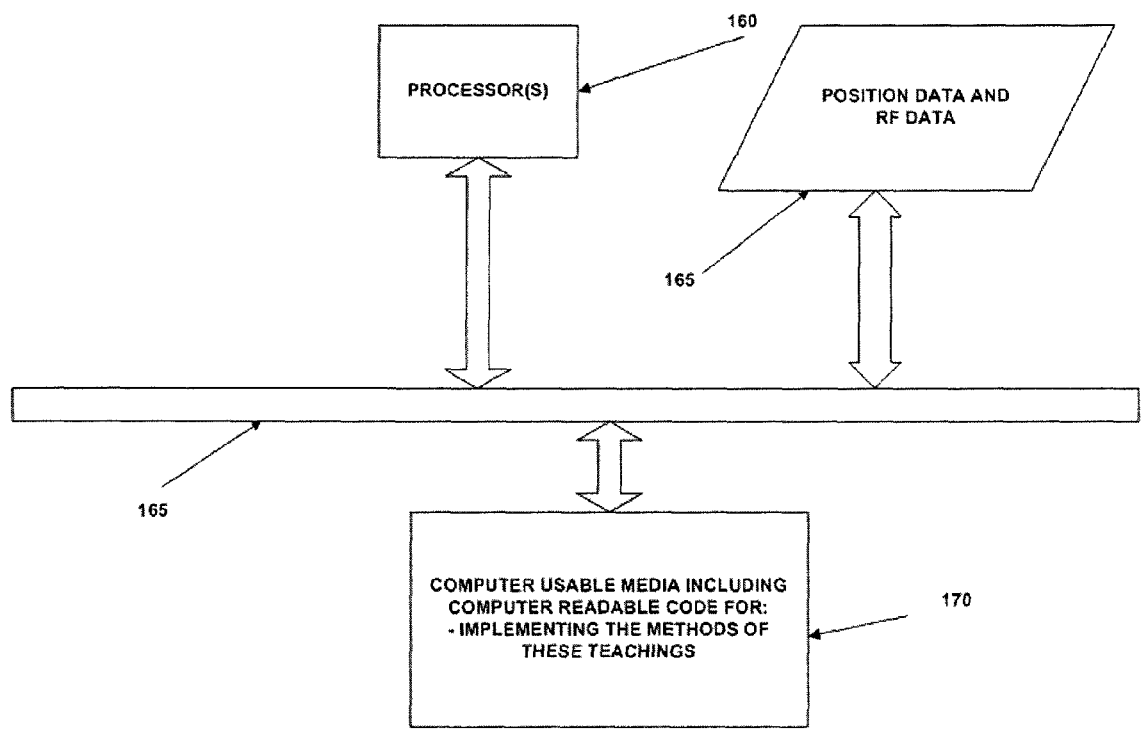
FIG. 2 is a schematic block diagram representation of components of one embodiment of the system of these teachings.

It should be noted that, in one embodiment, the estimator component 120, the re-phasing component 140 and the RF location component 150 can be electronically implemented using one or more processors and computer readable media. Such an electronic implementation is shown in FIG. 2 in which one or more processors 160 receive position data and RF data 165 and computer usable media 170 has computer readable code embodied therein for implementing the methods of these teachings. The one or more processors 160, the position data and RF data interface 165 and a computer usable media 170 are operatively connected by a computer interconnection component 165 (such as a computer bus).

In one exemplary embodiment, disclosed hereinbelow, the estimator component is a Kalman filter. In the exemplary embodiment disclosed hereinbelow, the re-phased RF data comprises a matrix of re-phased RF data and the RF location component includes computer usable media that has computer readable code embodied therein that causes one or more processors to maximize a predetermined metric. In the exemplary embodiment disclosed hereinbelow, the metric is a first singular value of the matrix of re-phased RF data. The maximization of the predetermined metric results in a second location estimate.

In order to further elucidate these teachings, exemplary embodiments of the components of the embodiment shown in FIG. 1a are disclosed below. It should be noted that these teachings are not limited only to the exemplary embodiments.

Figure 3:
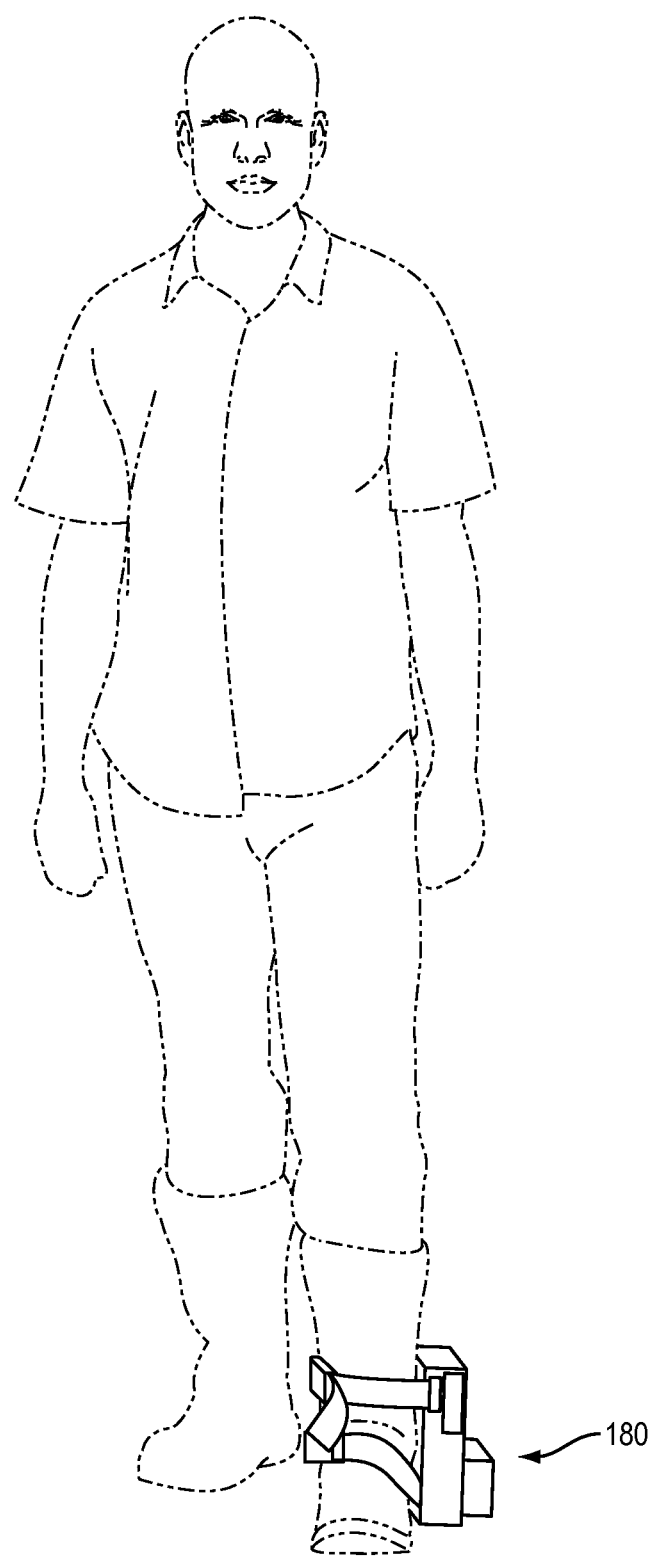
FIG. 3 shows a pictorial representation of one component of an embodiment of the system of these teachings, the mobile unit comprising the inertial measurement unit and an RF transmitter.

In one exemplary embodiment, the inertial measurement unit includes a three axis accelerometer, a three axis gyroscope and a three axis magnetometer, the inertial measurement unit being capable of measurements at a rate such as, for example, 150 Hz, the measurement rate not being a limitation of these teachings. The inertial measurement unit can be configured in a small form factor and placed together with the mobile transceiver TX. One instance of that configuration is shown in FIG. 3, where the combined inertial measurement unit and mobile transceiver is attached to a boot 180.

Although Kalman filters are known in the art, an exemplary embodiment of the Kalman filter used in these teachings is disclosed below. Displacement of an object can be described in terms of state variables. In the present instance, the states are the position and velocity, acceleration, rotation and rotational velocity vectors of the mobile transceiver/inertial measurement unit, p, v, a, r, u respectively.

$$x = \begin{bmatrix} p \\ v \\ a \\ r \\ u \end{bmatrix}$$

The value of $x_{k+1}$, the next state is a function of the current states and a process noise term $w_k$. This process noise term is a random vector, which models the changes in states of the tracked personnel as a random process.

$$x_{k+1} = Ax_k + w_k$$

where the A is the state transition matrix that describes the dynamics of the state variables and $w_k$ is a process noise term. The measured values supplied by the inertial sensor unit comprise a vector of values represented by $$y_k = Cx_k + v_k$$

Where C is referred to as the observation matrix and v is the measurement noise. The values of C select as observables, for example in the present embodiment, the linear accelerations and the rotational velocities of the inertial sensor.

Once the equations are described in state space form, the application of the Kalman filter is conventional (see for example, V. Amendolare, D. Cyganski, R. J. Duckworth, S. Makarov, J. Coyne, H. Daempfling, and B. Woodacre, "WPI Precision Personnel Locator System: Inertial Navigation Supplementation," in IEEE/ION Position Location and Navigation Symposium (PLANS) Conference, May 2008 or An Introduction to the Kalman Filter, UNC-Chapel Hill, TR 95-041, Jul. 24, 2006, both of which are incorporated by reference herein in their entirety and for all purposes).

As shown herein above, the RF data signals at two data or more captures can be re-phased so that they appear to originate from the same location. This allows using multiple RF data captures for the formation of a single solution, which is known to increase solution accuracy as it is equivalent to an increase of SNR (signal to noise ratio). Moreover, the multipath and noise conditions at spatially diverse locations are very different, and hence weakly correlated. Because the received signals have been re-phased based on the expected distance based time delay, the direct path components from each location will be highly correlated, which gives them a much stronger presence in the location metric function disclosed hereinbelow.

It should be noted that while re-phasing the two data captures displaced one from the other can allow increasing the effective signal to noise ratio, the RF location component provides the time wise stability lacking in the purely inertial location estimates. Embodiments of the RF location component are disclosed in U.S. Patent Application Publication No. 20100277339 (corresponding to U.S. patent application Ser. No. 12/664,844, Precision Location Methods And Systems, by D. Cyganski et al.), which is incorporated by reference herein in its entirety and for all purposes.

Exemplary Embodiment of the RF Location Component—the SART Subsystem

One embodiment of the RF location component 150 of FIG. 1a is referred to herein as singular array reconciliation tomography ("SART"). "SART" is an exhaustive algorithm. The entire space that the transmitter may reside in is discretized as a grid with some spatial resolution. This grid is scanned and a metric is evaluated at each scan location in the grid. The metric is chosen such that in a zero noise and zero multipath scenario, it is maximized when the presumed mobile transmitter is chosen as the actual transmitter location while also featuring invariance under certain phase and amplitude distortions.

As described above, the processor determines a metric at a set of trial locations within a region in which the transmitter is believed to be located. In SART, this metric for a trial location is the first singular value of the singular value decomposition (SVD) of a matrix formed from the signals received by n receivers re-phased based on the distances between the receivers R and the trial position. The matrix for the trial position is formed as described hereinabove.

Using SART, for a trial position, the complex analytic signal representation of the range re-phased signal received by the nth receiver is given $$R'_n(t) = a_n x(t - t_n + \hat{t}_n + t_o) e^{j\phi_n},$$

where $a_n$ represents the total system gain and path dependent propagation attenuation at the nth receiver for the given transmitter position, $\phi_n$ is the total frequency independent phase shift (i.e., the time shift caused by channel specific characteristics and an offset in the nth receiver's local oscillator), $\hat{t}_n$ is the channel-independent time delay of the transmitted signal from the trial position to the nth receiver, $t_n$ is the time delay due to propagation of the transmitted signal from the transmitters actual position, and $t_o$ is offset between the transmitter clock and that of a common clock shared by all receivers.

The nth column of the matrix referred to above is populated with a discrete frequency vector representation of the signal received by the nth receiver re-phased based on a distance corresponding to a trial position. The nth column vector is represented as follows $$R'_n = \begin{bmatrix} R'_n(0) \\ R'_n(1) \\ \vdots \\ R'_n(m) \end{bmatrix}$$

$$= \begin{bmatrix} c_n X'(0) e^{j\omega_0(\hat{t}_n - t_n)} \\ c_n X'(1) e^{j\omega_1(\hat{t}_n - t_n)} \\ \vdots \\ c_n X'(m) e^{j\omega_m(\hat{t}_n - t_n)} \end{bmatrix}$$

where X' corresponds to a discrete vector representation of the transmitted signal re-phased to take into account the offset, $t_0$, between the transmitter's clock and the common receiver clock; $c_n$ corresponds to the frequency independent phase offset corresponding to the nth receiver; and $\omega_m$, is the frequency of the mth discrete Fourier component of the received signal. Thus, $R'_n$, at a trial location, is a function of the presumed values of the distances between the receivers and the trial position.

For a trial position, the columns of a matrix R' are populated in the following fashion $$R' = \begin{bmatrix} R'_1(0) & R'_2(0) & \cdots & R'_N(0) \\ R'_1(1) & R'_2(1) & \cdots & R'_N(1) \\ \vdots & \vdots & \ddots & \vdots \\ R'_1(m) & R'_2(m) & \cdots & R'_N(m) \end{bmatrix}$$

$$= \begin{bmatrix} c_1 X'(0) e^{j\omega_0(\hat{t}_1 - t_1)} & c_2 X'(0) e^{j\omega_0(\hat{t}_2 - t_2)} & \cdots & c_N X'(0) e^{j\omega_0(\hat{t}_N - t_N)} \\ c_1 X'(1) e^{j\omega_1(\hat{t}_1 - t_1)} & c_2 X'(1) e^{j\omega_1(\hat{t}_2 - t_2)} & \cdots & c_N X'(1) e^{j\omega_1(\hat{t}_N - t_N)} \\ \vdots & \vdots & \ddots & \vdots \\ c_1 X'(m) e^{j\omega_m(\hat{t}_1 - t_1)} & c_2 X'(m) e^{j\omega_m(\hat{t}_2 - t_2)} & \cdots & c_N X'(m) e^{j\omega_m(\hat{t}_N - t_N)} \end{bmatrix}$$

If the target position is not the correct distance away from the nth receiver, $\hat{t}_n$ will not equal $t_n$. As can be seen in the above equation, this results in the re-phased signal $R'_n$ including non-zero phase shifts, which vary for each carrier in relation to their frequency, $\omega_m$. In the case of equally spaced frequency samples as arise for DFT signal decomposition, these phase shifts linearly progress with increasing row index. In the specific case wherein the presumed position is the actual target position (as designated by the tilde), for all receivers, $\hat{t}_n$ will equal $t_n$, thereby canceling out the frequency dependent phase shift. In that instance, all the columns of the matrix match to within a complex scalar constant.

The SVD of a matrix takes an arbitrary matrix, M, into a matrix product representation, $M = U\Sigma V^H$ in which U and V are unitary matrices (where superscript H indicates the Hermetian operator which obtains the complex conjugate transpose of the quantity indicated), and $\Sigma$ is a diagonal matrix with non-negative real elements $\sigma_1 > \sigma_2 > \ldots \sigma_n$ known as the singular values of the matrix. The SVD decomposition is said to be a rank-revealing decomposition as only $\sigma_1$ through $\sigma_k$ are non-zero for a matrix of rank k, and a rank k matrix which has been slightly perturbed by errors has nearly zero values for $\sigma_{k+1}$ through $\sigma_n$. Thus the size of $\sigma_1$ as compared to the other singular values is a robust measure of the extent to which all the columns of a matrix match to within a scalar constant of each other. As this is the exact condition that indicates that a trial location is the correct position of a transmitter, as described above, the SVD makes an ideal metric of the likelihood that a trial position corresponds to a correct transmitter location.

The above discussion has been couched within the simplified model of a single direct path signal at all receivers. However, the rank revealing properties of singular value decomposition ("SVD") yields a process that is not only robust but also informational in the realistic case of operation in environments that corrupt the received direct path signal with multi-path components.

Results Obtained with the Exemplary Embodiment

The exemplary embodiment disclosed herein above was applied and tested with an actual INS (inertial navigation system) in a residential building. The demonstration used a foot mounted INS and RF transmitter as shown in FIG. 3. The outcomes of the test are illustrated in FIGS. 4a and 4b. In FIG. 4a, the path of the mobile target (as the individual wearing the RF and INS units walks a closed path in the house) as estimated by the SART process using RF data alone is shown superimposed on an outline of the building (solid line). FIG. 4b, the ISART estimated data using the relative position information from the INS together with the RF data is shown together with the estimates from the SART process using RF data alone. As is evident, the large outliers and general irregularity of the path estimate have been removed by the use of the many virtual antenna positions obtained from the inertial data.

Other Exemplary Embodiments of the RF Location Component

A number of other exemplary embodiments of the RF location component, dedicated signal singular array reconciliation tomography ("DSSART") algorithms, are disclosed in U.S. Patent Application Publication No. 20100277339 (corresponding to U.S. patent application Ser. No. 12/664, 844, Precision Location Methods And Systems, by D. Cyganski et al.), those embodiments being incorporated by reference herein in their entirety.

Another exemplary embodiment of the RF location component 150 utilizes the Transactional Array Reconciliation Tomography (TART) method (see, for example, V. T. Amendolare, D. Cyganski, and R. J. Duckworth, "Transactional array reconciliation tomography for precision indoor location," submitted, 2012; A Bayesian Fusion Algorithm for Precision Personnel Location in Indoor Environments, ION ITM 2011 Session A2: Urban and Indoor Navigation Technology 1, Jan. 24-26, 2011, San Diego Calif., both of which are incorporated by reference herein in their entirety for all purposes). The TART method requires the use of transceivers at the mobile and fixed reference nodes in order to obtain synchrony of signal time bases through the two-way exchange of the ranging signals begin used to measure propagation delays between mobile and stationary nodes. With such synchrony established, in the resulting re-phased signal matrix, the DC (that is, zero frequency or in this case, matrix components that are constant over an entire column of the signal matrix) terms will add constructively and the absolute value of each element in the resulting re-phased signal matrix is an indication of the magnitude of the DC term. The metric used in the component 150, when the component utilizes the Transactional Array Reconciliation Tomography (TART) method, is a measure of the DC component present across all columns of the original re-phased matrix.

Other System Embodiments

Figure 5:
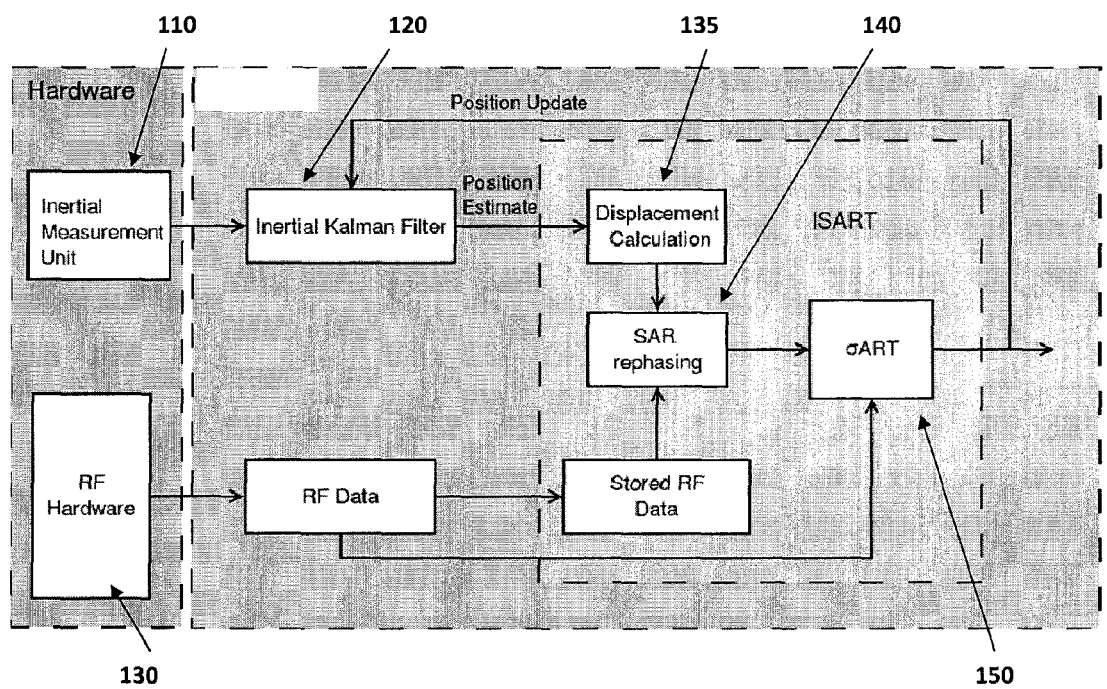
FIG. 5 represents a schematic block diagram representation of another embodiment of the system of these teachings.

Another embodiment of the system of these teachings is shown in FIG. 5. In the embodiment shown in FIG. 5, the second position estimate is provided to the inertial position estimator component. By feeding this combined solution into the recursive Kalman estimator, improvements in the succeeding inertial estimates may be obtained as progressive drift in position and rotation may be corrected by the drift free information obtained from the RF solutions.

In one or more embodiments, the method of these teachings includes determining relative displacements between a location of a mobile node at each of two or more data captures, the mobile node exchanging RF signals with a number of reference nodes, re-phasing the RF signals to a virtual node location; constituting re-phased RF data and providing the RF data and the re-phased RF data to an RF location component, wherein signal-to-noise ratio and accuracy are increased.

In other embodiments, operation of the system of these teachings includes determining a relative displacement between a location of a mobile transmitting node at each of two data captures, the mobile transmitting node providing RF data to a number of receivers, re-phasing the RF data to a virtual receiver node location; constituting re-phased RF data and providing the RF data and the re-phased RF data to an RF location component, wherein signal-to-noise ratio and accuracy are increased.

In one instance, the relative displacement are obtained by receiving, at an estimator component, data from an inertial measurement unit located at the mobile transmitting unit, obtaining, from the estimator component, position estimates for the location of the mobile receiving node at each of the two data captures and determining the relative displacement from the position estimates.

In one embodiment, as disclosed hereinabove, the estimator component is a Kalman filter.

During operation of the system of these teachings, in one or more embodiments, the second position estimate is obtained from the RF location component (in the exemplary embodiment disclosed hereinabove, by application of the SART method). In some embodiments, the second position estimates provided to the estimator component in order to refine the first position estimate.

In some instances, obtaining the second position estimate includes maximizing a predetermined metric. In the instances in which the re-phased RF data comprises a matrix of re-phased RF data, one embodiment of the predetermined metric is a first singular value of the matrix of re-phased RF data.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Off. Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

Although the invention has been described with respect to various embodiments, it should be realized these teachings are also capable of a wide variety of further and other embodiments within the spirit and scope of the appended claims.

What is claimed is:

1. A method for obtaining a position estimate having increased accuracy from a radio frequency (RF) location system in an indoor environment, the method comprising:
   determining, using an estimator component and an inertial measurement unit, a relative displacement between a location of a mobile node at each of at least two instances of exchange of data with reference nodes from a number of reference nodes; the mobile node exchanging RF signals with the number of reference nodes; the mobile node being in the indoor environment; the inertial measurement unit providing acceleration and velocity estimates to the estimator component; the estimator component providing a first position estimate for the location of the mobile node;
   re-phasing RF data to a virtual node location; the RF data, after re-phasing, constituting re-phased RF data; the re-phased RF data has, as origination location, the virtual node location; the virtual node location being a virtual location of the mobile node; and
   providing the RF data and the re-phased RF data to an RF location component; the RF location component receiving the RF data and the re-phased RF data and providing a second position estimate for the location of the mobile node;
   wherein effective signal-to-noise ratio and as a result position estimate accuracy are increased since multiple RF data captures are used to form a single solution; the determining, re-phasing and providing being performed by one or more processors and computer usable media that has computer readable code embodied therein that causes the one or more processor to perform the determining, re-phasing and providing an accurate position estimate of the location of the mobile node in an indoor environment to a location outside of the indoor environment.

2. The method of claim 1 wherein determining the relative displacement comprises: receiving, at the estimator component, data from the an inertial measurement unit located at the mobile node; obtaining, from the estimator component using the data from the inertial measurement unit, position estimates for the location of the mobile node at said each of said at least two instances of exchange of data with reference nodes from a number of reference nodes; position estimates and determining the relative displacement from the position estimates.

3. The method of claim 2 wherein the estimator component-is comprises a Kalman filter.

4. The method of claim 1 further comprising providing the second position estimate to an estimator component.

5. The method of claim 1 wherein obtaining the second position estimate comprises maximizing a predetermined metric.

6. The method of claim 5 wherein the re-phased RF data comprises a matrix of re-phased RF data; and wherein the predetermined metric is a first singular value of the matrix of re-phased RF data.

7. The method of claim 1 wherein the mobile node is a mobile transceiver; and wherein the reference nodes are receivers.

8. A system for increasing accuracy of location system in an indoor environment, the system comprising:
 a mobile node;
 a number of reference nodes; the mobile node exchanging RF signals with the number of reference nodes; the RF signals constituting RE data;
 an inertial measurement unit providing data acceleration and velocity estimates for a location of the mobile node;
 an estimator component receiving the acceleration and velocity estimates and providing a first position estimate and a relative displacement;
 a re-phasing component receiving a the relative displacement between a location of the mobile node at each of at least two instances of exchange of data with reference nodes from the number of reference nodes: the mobile node exchanging RF data with the number of reference nodes at said each of the at least two signal exchanges; the re-phasing component producing re-phased RF data: the re-phased RF data has, as origination location, the virtual node location; the virtual node location being a virtual location of the mobile node: the relative displacement being obtained from the first position estimate for the location of the mobile node at said each of the at least two signal exchanges;
 and an RE=F location component receiving the re-phased RF data and providing a second position estimate for the location of the mobile node in an indoor environment to a location outside of the indoor environment.

9. The system of claim 8 wherein the mobile node comprises a RF transmitter: and wherein the reference nodes comprise RF receivers.

10. The system of claim 8 wherein each one of said estimator component, said re-phasing component, and said RF location component is electronically implemented using at least one processor and computer readable media.

11. The system of claim 8 wherein the estimator component comprises a Kalman filter.

12. The system of claim 8 wherein the re-phased RE data comprises a matrix of re-phased RE data; and wherein the RF location component comprises: computer useable media having computer readable code embodied therein that causes one or more processors to maximize a predetermined metric.

13. The system of claim 12 wherein the predetermined metric is a first singular value of the matrix of re-phased RF data.

14. The system of claim 8 wherein the second position estimate is provided to the estimator component.

* * * * *